US006939037B2

(12) United States Patent
Junginger et al.

(10) Patent No.: US 6,939,037 B2
(45) Date of Patent: Sep. 6, 2005

(54) DETERMINING THE TEMPERATURE OF AN EXHAUST GAS SENSOR BY MEANS OF CALIBRATED INTERNAL RESISTANCE MEASUREMENT

(75) Inventors: Erich Junginger, Stuttgart (DE); Dietmar Blessing, Holzgerlingen (DE); Christian Zimmermann, Tuebingen (DE); Wilhelm Haag, Reutlingen (DE); Frank Molwitz, Kornwestheim (DE); Rene Schenk, Tamm (DE); Bernd Hilgenberg, Reutlingen (DE); Johann Riegel, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/399,152

(22) PCT Filed: Jul. 6, 2002

(86) PCT No.: PCT/DE02/02478

§ 371 (c)(1),
(2), (4) Date: Sep. 22, 2003

(87) PCT Pub. No.: WO03/016890

PCT Pub. Date: Feb. 27, 2003

(65) Prior Publication Data

US 2004/0047399 A1 Mar. 11, 2004

(30) Foreign Application Priority Data

Aug. 14, 2001 (DE) ........................................ 101 38 806

(51) Int. Cl.[7] .......................... G01K 1/00; G01K 17/16; G01N 25/00; F02D 41/00

(52) U.S. Cl. ............................ 374/144; 374/1; 374/45; 702/130; 702/99; 123/672

(58) Field of Search ............................... 374/1, 4.5, 57, 374/144, 170, 4, 141, 142, 172, 183, 185; 73/23.2, 1.06, 23.25, 1.02, 23.32, 25.01

(56) References Cited

U.S. PATENT DOCUMENTS

| | | | | | |
|---|---|---|---|---|---|
| 3,886,932 | A | * | 6/1975 | Suessmilch | 600/508 |
| 4,210,024 | A | * | 7/1980 | Ishiwatari et al. | 374/183 |
| 4,841,934 | A | * | 6/1989 | Logothetis et al. | 123/693 |
| 5,219,228 | A | * | 6/1993 | Ker et al. | 374/144 |
| 5,313,121 | A | * | 5/1994 | Cianci et al. | 327/103 |
| 5,414,352 | A | * | 5/1995 | Tanase | 324/158.1 |
| 5,519,304 | A | * | 5/1996 | Andrieu et al. | 324/430 |
| 5,524,472 | A | * | 6/1996 | Hotzel | 73/1.07 |
| 5,655,305 | A | * | 8/1997 | Fletcher | 374/170 |
| 5,941,927 | A | * | 8/1999 | Pfitz | 701/102 |
| 6,096,186 | A | * | 8/2000 | Warburton | 205/782 |
| 6,136,170 | A | * | 10/2000 | Inoue et al. | 204/424 |
| 6,294,075 | B1 | * | 9/2001 | Poggio et al. | 205/785 |
| 6,341,599 | B1 | * | 1/2002 | Hada et al. | 123/688 |
| 6,397,659 | B1 | * | 6/2002 | Mizoguchi et al. | 73/23.2 |
| 6,398,407 | B2 | * | 6/2002 | Hashimoto | 374/144 |
| 6,467,954 | B2 | * | 10/2002 | Honda et al. | 374/183 |
| 6,533,921 | B2 | * | 3/2003 | Miyata et al. | 205/781 |
| 6,789,533 | B1 | * | 9/2004 | Hashimoto et al. | 123/672 |
| 2003/0034534 | A1 | * | 2/2003 | Thakur | 257/414 |

FOREIGN PATENT DOCUMENTS

| | | |
|---|---|---|
| DE | 35 33 197 | 3/1987 |
| DE | 251 200 | 11/1987 |
| DE | 38 36 045 | 4/1990 |
| EP | 1 001 261 | 5/2000 |

* cited by examiner

*Primary Examiner*—Gail Verbitsky
(74) *Attorney, Agent, or Firm*—Walter Ottesen

(57) ABSTRACT

For achieving a highest possible measuring accuracy of a circuit for measuring the internal resistance of an exhaust-gas sensor, a method and a circuit for measuring the internal resistance R1 (10) of an electrochemical cell (12) are provided for determining the temperature of an exhaust-gas sensor, especially of a motor vehicle. The circuit is provided with the objective to improve the control to a constant temperature to therefore also improve the performance of the exhaust-gas sensor. A measurement current I_Mess (20) is applied to the internal resistance R1 (10) of the electrochemical cell (12) and a resulting first voltage is detected. A switchover to a reference resistor R2 takes place from time to time or at regular time intervals. With a switchover to the reference resistor R2, the resulting second voltage is stored and thereafter is applied as a reference value for the measurement of the internal resistance R1 (10). The switchover (18) to the reference resistor R2 takes place, for example, via force/sense lines.

6 Claims, 1 Drawing Sheet

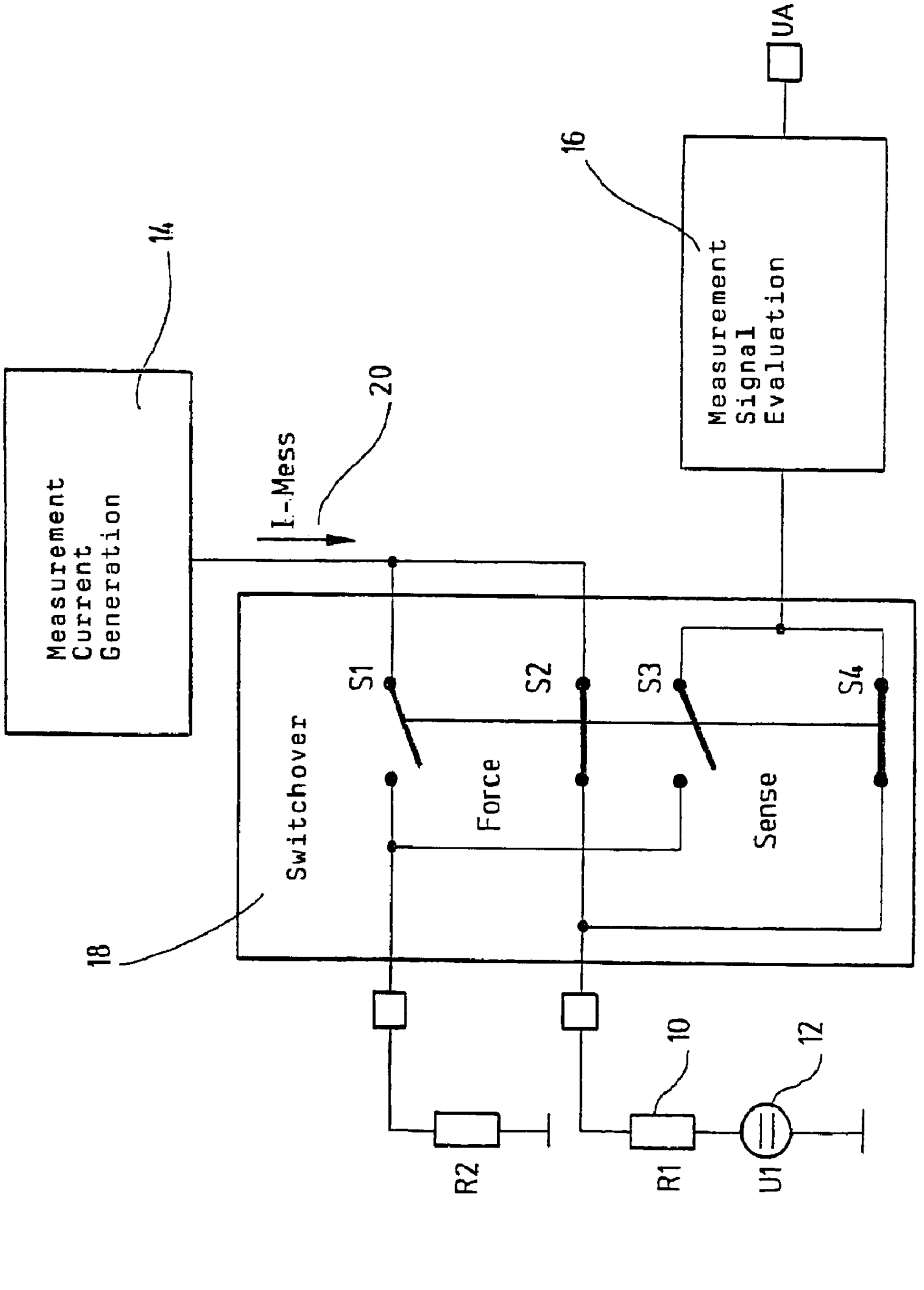
Measurement Current Generation
14
I-Mess
20
Measurement Signal Evaluation
16
UA
Switchover
18
Force
Sense
S1
S2
S3
S4
R2
R1
10
U1
12

DETERMINING THE TEMPERATURE OF AN EXHAUST GAS SENSOR BY MEANS OF CALIBRATED INTERNAL RESISTANCE MEASUREMENT

FIELD OF THE INVENTION

The invention relates generally to the temperature measurement in exhaust-gas sensors, especially of motor vehicles and, especially, a method and a circuit for measuring the internal resistance of an electrochemical cell determining the temperature of such an exhaust-gas sensor.

BACKGROUND OF THE INVENTION

A lambda control in combination with a catalytic converter is today the most effective exhaust-gas cleaning method for the spark-ignition engine. Very low exhaust-gas values can be obtained only together with ignition and injection systems which are presently available. The use of a three-way or selective catalytic converter is especially effective. This catalytic converter type has the characteristic of decomposing hydrocarbons, carbon monoxide and nitrous oxide up to more than 98% in the event that the engine is operated in a range of approximately 1% about the stoichiometric air/fuel ratio with lambda=1. The lambda indicates how far the actually present air/fuel mixture deviates from the value lambda=1, which corresponds to the mass ratio of 14.7 kg air to 1 kg gasoline, which is theoretically necessary for the complete combustion; that is, lambda is the quotient of supplied air mass and theoretical air requirement.

In the lambda control, the particular exhaust gas is measured and the supplied fuel quantity is immediately corrected in correspondence to the measurement signal by means of, for example, the injection system. A lambda probe is used as a measurement sensor which exhibits a voltage jump exactly at lambda=1 and so supplies a signal which indicates whether the mixture is richer or leaner than lambda=1. The operation of the lambda probe is based on the principle of a galvanic oxygen concentration cell having a solid-state electrolyte.

Lambda probes, which are configured as two-point sensors, operate in accordance with the Nernst principle as known per se based on a Nernst cell. The solid-state electrolyte comprises two boundary surfaces separated by a ceramic. The utilized ceramic material becomes conductive for oxygen ions at approximately 350° C. so that the so-called Nernst voltage is generated for a different oxygen component at both sides of the ceramic between the boundary surfaces. This electrical voltage is an index for the difference of the oxygen component at both sides of the ceramic. The residual oxygen content in the exhaust gas of an internal combustion engine is dependent to a great extent on the air/fuel ratio of the mixture supplied into the engine. For this reason, it is possible to apply the oxygen content in the exhaust gas as an index for the air/fuel mixture actually present.

The function and the measuring accuracy of the lambda probes is dependent, to a very great extent, on the temperature of the measuring element, that is, on the Nernst cell in the present case. The probe temperature would be subjected to intense fluctuations without additional measures because of the changing exhaust-gas temperatures and exhaust-gas quantities. Accordingly, in a manner known per se, the probe temperature is held as constant as possible. This controlled power is supplied to the probe with the aid of an electrical heater. A suitable measurement signal, which indicates the sensor temperature, is needed in order to determine the particular required quantity of heating power. As a rule, the electric internal resistance of the electrochemical Nernst cell is applied as a measurement signal. For this purpose, for example, a measurement current is applied to the internal resistance and the voltage which adjusts is determined with the aid of an evaluation circuit.

The measurement current is preadjusted via suitable dimensioning of the evaluation circuit in a manner known per se. In the components of the evaluation circuit, often tolerances which are present lead to fault influences in the measurement of the above-mentioned internal resistance and thereby affect the control accuracy of the heater control.

SUMMARY OF THE INVENTION

It is therefore a basis of the present invention to provide a method initially mentioned herein as well as a circuit which avoid the above-mentioned disadvantages and make available the highest possible measuring accuracy of a circuit for measuring the internal resistance with the objective of improving the control to a constant temperature and therefore improving also the performance of the exhaust-gas sensor.

This task is solved with the features of the independent claims. Advantageous embodiments or further improvements are the subject matter of the dependent claims.

The invention suggests a special calibration method wherein (preferably in combination with force/sense lines) there is a switchover from time to time or regularly to a reference resistance and the electric voltage, which then adjusts, is stored in a memory. This stored voltage value thereafter serves as a reference value for the measurement of the actually desired value of the internal resistance R1.

With these measures, the measuring accuracy of a circuit for measuring the internal resistance of an exhaust-gas sensor can be increased. The method of the invention as well as the circuit facilitate especially the system performance of the composite of exhaust-gas sensor (for example, lambda probe) and the evaluation circuit mentioned initially herein.

BRIEF DESCRIPTION OF THE DRAWING

The invention will be explained hereinafter with reference to the attached drawing and with reference to an embodiment. The single FIGURE shows a block circuit diagram of a circuit according to the invention.

DESCRIPTION OF THE PREFFERED EMBODIMENTS OF THE INVENTION

The shown circuit functions to measure the internal resistance (R1) 10 and therefore serves indirectly for determining the temperature of a schematically shown Nernst cell 12 of an electrochemical exhaust-gas sensor (not shown). The electrochemical source voltage of the Nernst cell is here identified by 12 (U1). The circuit comprises three circuit units: a measurement current generating unit 14; a measurement signal evaluation unit 16; and, a switchover unit 18.

The generated measurement current (I_Mess) 20 is applied to the Nernst cell 12. By means of this measurement current (I_Mess) 20, a voltage is generated at R1 which is proportional to the resistance value of R1. This voltage is then amplified by the measurement signal evaluation unit 16 and is so processed that an optimal detection of the measurement signal is made possible via an analog-to-digital converter (not shown). This signal can then be advantageously further processed digitally with the aid of the signal supplied by the analog-to-digital converter.

Possibly occurring tolerances and voltage drifts in the measurement current generating unit 14 as well as in the measurement signal evaluation unit 16 would, without special measures, be included as errors in the output signal (UA). To obtain a high accuracy of the R1 signal, highly precise and therefore expensive circuit techniques would have to be used.

The circuit shown as well as the method for operating the same make possible an improvement of accuracy exclusively with the use of electronic standard components. In addition, an integration of the circuit by means of standard semiconductor processes is made possible.

On the one hand, the calibration resistance R2 and the switchover unit 18, which includes several throwover switches (S1 to S4), serve for the above. By means of the throwover switches S1 to S4, the measurement value detection is switched over from time to time or at regular time intervals to the known, precisely defined resistor R2. The resistance value of R2 is so selected that it corresponds to the internal resistance R1 to be adjusted (in correspondence to the control point of the heater control). The signal voltage UA then adjusts at the output of the circuit and is stored in a memory of a microcontroller (not shown) and serves from thereon as a reference value for the measurement of the internal resistance R1.

With this measure, circuit-caused defects in the measurement current generating unit 14 and the measurement signal evaluation unit 16 can be eliminated. The accuracy of the output signal UA is therefore determined only by the accuracy of the calibrating resistor R2.

In order to further eliminate additional errors from the throwover switches S1 to S4, the switchover unit 18 is designed in the present embodiment as a force/sense circuit. The measurement current I_Mess 20 is switched via switches S1 and S2 (force switches) to the measuring resistor R1 or R2. Only slight accuracy requirements are imposed on the switches S1 and S2. Only the simultaneous operation of all switches has to satisfy minimal requirements which, as a rule, is easily satisfied for an integration of the circuit, for example, into an application specific integrated circuit (ASIC).

It is to be noted that the force/sense circuit is not absolutely required and can be omitted, for example, when the ratio of the resistance to be measured to the switch resistances is sufficiently high as, for example, with the use of low-ohmage switches. The same applies when the switches supply significant contributions to the measurement resistance value but the absolute value of the resistance to be measured is not important but it is only important to come as close as possible to the comparator resistor R2 which is present.

Coupling in the measurement signal into the measurement signal evaluation unit 16 takes place via the two switches S3 and S4 (sense switches). The measurement signal is only minimally influenced because of the high-ohmage input of the measurement signal evaluation unit 16. For this reason, relatively simple and cost effective (high ohmage) switches can be used for S3 and S4.

Measuring errors caused by the switches S1 to S4 are eliminated via the described calibration by means of resistor R2 as long as only S1 and S2 or S3 and S4 have comparable characteristics, for example, the same or like through-switch resistance.

Finally, it is noted that the evaluation circuit of the invention can also be advantageously used for two-cell broadband lambda probes which are formed from a Nernst cell and a pump cell coupled to the latter. The lambda probe and the evaluation circuit together provide a continuous lambda signal by means of which a lambda control can be adjusted to any desired operating point, that is, also to lambda unequal to 1 and, in this way, a "continuous lambda control" is provided.

What is claimed is:

1. A method of measuring th internal resistance (R1) of an electrochemical cell for determining the temperature of an exhaust-gas sensor including the electrochemical cell, the method comprising the steps of:

applying a measurement current (I_Mess) to the internal resistance (R1) of the electrochemical cell and detecting a resulting first voltage in the form of a voltage signal;

switching over to a reference resistor (R2) from time to time or at regular time intervals to obtain a second voltage which results from the measurement current (I_Mess);

storing the second voltage and thereafter applying the second voltage as reference value for the measurement of the internal resistance (R1); and, wherein said voltage signal, which results at internal resistance (R1), is amplified and/or processed by means of a measurement signal evaluation unit; and, wherein the measurement current (I_Mess) is switched to said internal resistance (R1) and reference resistor (R2) by means of force switches (S1, S2) and that the in-coupling of said first and second voltages into the measurement signal evaluation unit takes place via sense switches (S3, S4).

2. The method of claim 1, wherein said switching over to the reference resistor (R2) takes place by means of force/sense lines.

3. The method of claim 1, wherein the amplified and/or processed voltage signal is supplied to an analog-to-digital converter.

4. The method of claim 1, wherein the switches (S1) and (S2) and the switches (S3) and (S4) have the same or a similar through-switch resistance.

5. The method of claim 1, wherein said reference resistor (R2) has a resistance value; and, the resistance value of said reference resistor (R2) is so selected that it essentially corresponds to the internal resistance (R1) which is to be adjusted.

6. A circuit for measuring the internal resistance (R1) of an electrochemical cell for determining the temperature of an exhaust-gas sensor, the circuit comprising:

circuit means for carrying out the method of measuring the internal resistance (R1) of an electrochemical cell for determining the temperature of an exhaust-gas sensor including the electrochemical cell, the method including the steps of:

applying a measurement current (I_Mess) to the internal resistance (R1) of the electrochemical cell and detecting a resulting first voltage;

switching over to a reference resistor (R2) from time to time or at regular time intervals to obtain a second voltage which results from the measurement current;

storing the second voltage and applying the second voltage as reference value for the measurement of the internal resistance (R1);

a switchover unit having several throwover switches (S1 to S4); wherein the measurement current detection can be switched from time to time or regularly to the reference resistor (R2) by means of the throwover switches (S1 to S4); and, a measurement current generating unit and a measurement signal evaluation unit; and, the switchover of the measurement current (I_Mess) to the internal resistance (R1) and said reference resistor (R2) and the in-coupling of said detected first and second voltages into the measurement signal evaluation unit takes place via force/sense lines.

* * * * *

UNITED STATES PATENT AND TRADEMARK OFFICE

CERTIFICATE OF CORRECTION

PATENT NO. : 6,939,037 B2
DATED : September 6, 2005
INVENTOR(S) : Erich Junginger et al.

It is certified that error appears in the above-identified patent and that said Letters Patent is hereby corrected as shown below:

Column 3,
Line 66, delete "th" and substitute -- the -- therefor.

Signed and Sealed this

First Day of November, 2005

JON W. DUDAS
*Director of the United States Patent and Trademark Office*